(12) United States Patent
Takata et al.

(10) Patent No.: US 11,188,243 B2
(45) Date of Patent: Nov. 30, 2021

(54) STORAGE MANAGEMENT APPARATUS, INFORMATION SYSTEM, AND STORAGE MANAGEMENT METHOD

(71) Applicant: Hitachi, Ltd., Tokyo (JP)

(72) Inventors: Masanori Takata, Tokyo (JP); Yoshinori Ohira, Tokyo (JP); Hideo Saito, Tokyo (JP); Masakuni Agetsuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 16/804,617

(22) Filed: Feb. 28, 2020

(65) Prior Publication Data

US 2020/0326864 A1    Oct. 15, 2020

(30) Foreign Application Priority Data

Apr. 12, 2019    (JP) .............................. JP2019-076609

(51) Int. Cl.
*G06F 12/00* (2006.01)
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0644* (2013.01); *G06F 3/0647* (2013.01)

(58) Field of Classification Search
CPC ...... G06F 3/0631; G06F 3/0647; G06F 3/067; G06F 3/0644; G06F 3/0604
See application file for complete search history.

(56) References Cited

U.S. PATENT DOCUMENTS

| | | | |
|---|---|---|---|
| 8,166,257 B1 * | 4/2012 | Holl, II .................. | G06F 13/28 711/154 |
| 8,370,833 B2 | 2/2013 | Bolles et al. | |
| 9,678,683 B1 * | 6/2017 | Chen ......................... | G06F 9/50 |
| 2011/0004735 A1 * | 1/2011 | Arroyo .................... | G06F 9/455 711/162 |
| 2012/0166748 A1 * | 6/2012 | Satoyama ............. | G06F 3/0631 711/165 |
| 2012/0311292 A1 * | 12/2012 | Maniwa ................ | G06F 3/0685 711/170 |
| 2016/0129779 A1 * | 5/2016 | Shimokawa ..... | B60K 15/03519 137/587 |
| 2016/0364165 A1 * | 12/2016 | Appel ..................... | G06F 3/067 |

\* cited by examiner

*Primary Examiner* — John A Lane
(74) *Attorney, Agent, or Firm* — Baker Botts L.L.P.

(57) ABSTRACT

Even though storage systems are different in types, storage pools in a plurality of storage systems are integrated, and a storage volume is created in a suited storage pool corresponding to a storage requirements. In an information system where a plurality of storage systems (a disk array, an SDS system, and an HCI system) is present, when creating the storage volume using requested storage requirements as parameters, a storage management server selects a storage pool that satisfies the storage requirements based on comparison of the storage requirements and characteristic information held in first management information (a storage pool management table), the server creates the storage volume in the selected storage pool, and the server adds an entry relating to the created storage volume to second management information (a volume management table).

14 Claims, 14 Drawing Sheets

FIG. 3

STORAGE POOL MANAGEMENT TABLE 122

| STORAGE POOL ID | STORAGE ID | STORAGE TYPE | PROVIDED PROTOCOL | PROVIDED FUNCTION | DATA PROTECTION LEVEL | PERFORMANCE (kiops) | TOTAL SPACE | USED SPACE | FREE SPACE |
|---|---|---|---|---|---|---|---|---|---|
| 0000 | 0010 | DISK ARRAY | FC, iSCSI | SNAPSHOT COMPRESSION DEDUPLICATION REMOTE COPY TIERING | 10D2P | RANDOM READ 4kB: 500 RANDOM WRITE 4kB: 250 | 1280TB | 1024TB | 256TB |
| 0001 | 0011 | SDS | iSCSI | SNAPSHOT COMPRESSION DEDUPLICATION REMOTE COPY | 6D2P | RANDOM READ 4kB: 300 RANDOM WRITE 4kB: 150 | 1024TB | 0TB | 1024TB |
| 0002 | 0012 | SDS (HCI) | iSCSI | SNAPSHOT COMPRESSION DEDUPLICATION REMOTE COPY | 4D1P | RANDOM READ 4kB: 300 RANDOM WRITE 4kB: 150 | 384TB | 256TB | 128TB |
| ... | ... | ... | ... | ... | ... | ... | ... | ... | ... |
| 1220 | 1221 | 1222 | 1223 | 1224 | 1225 | 1226 | 1227 | 1228 | 1229 |

FIG. 4

| VOLUME MANAGEMENT TABLE | | | | | | | | | |
|---|---|---|---|---|---|---|---|---|---|
| VOLUME ID | STORAGE POOL ID | USED PROTOCOL | USED VOLUME SIZE | USED FUNCTION | REQUESTED PROTOCOL | REQUESTED VOLUME SIZE | REQUESTED FUNCTION | REQUESTED AVAILABILITY | REQUESTED PERFORMANCE (kiops) |
| 0100 | 0001 | iSCSI | 512TB | SNAPSHOT COMPRESSION DEDUPLICATION | iSCSI | 512TB | SNAPSHOT COMPRESSION DEDUPLICATION | 99.999% | RANDOM READ 4kB: 200 |
| 0101 | 0000 | iSCSI | 128TB | SNAPSHOT REMOTE COPY | iSCSI | 128TB | SNAPSHOT REMOTE COPY | 99.999% | RANDOM READ 4kB: 400 |
| 0102 | 0002 | iSCSI | 256TB | COMPRESSION DEDUPLICATION | iSCSI | 256TB | COMPRESSION DEDUPLICATION | 99.99% | RANDOM READ 4kB: 300 |
| ... | ... | ... | ... | ... | ... | ... | ... | ... | ... |

123

1230 1231 1232 1233 1234 1235 1236 1237 1238 1239

STORAGE MANAGEMENT APPARATUS, INFORMATION SYSTEM, AND STORAGE MANAGEMENT METHOD

BACKGROUND

The present invention relates to a storage management apparatus, an information system, and a storage management method that are suited to being applied to a storage management apparatus that manages a storage system, an information system that includes a computer which operates as at least a part of a storage system, and a storage management method for managing a storage system.

In information systems, there are various forms of storage systems that are composed of one or more storage devices. For example, a disk array, which is conventionally widely known, is an external storage device that is connected to a computer server via a SAN (Storage Area Network) and that provides a data storage space to the computer server. In addition to this, as forms of storage systems, on which attention is focused nowadays, include an SDS (Software Defined Storage) and an HCI (Hyper-Converged Infrastructure).

In the SDS, SDS software having a storage function (in the present specification (this is referred to as a "storage control program") is executed on a physical computer (e.g. a general-purpose computer), and thus the computer becomes a storage device (i.e., the computer becomes an SDS). In the case in which a vendor provides a storage device that is an SDS, the vendor provides a storage control program for a user. The user installs this storage control program on a computer prepared by the user. As a result, the computer becomes an SDS. The disk array and the SDS are separate systems in which a computer server is connected to a storage device via a network.

The HCI is an integrated system in which a computer server and a storage device are aggregated on one physical computer (e.g. a general-purpose computer). Typically, a plurality of servers is aggregated on one computer by server virtualization technique. The storage provided by the HCI is embodied by the SDS.

For example, U.S. Pat. No. 8,370,833 discloses a technique that provides a storage pool in a form of the HCI. More specifically, U.S. Pat. No. 8,370,833 discloses a computer system in which a virtual server that manages a storage area and an application virtual machine are present on a physical computer by server virtualization. This virtual server provides virtual areas for a virtual storage pool, and embodies a virtual storage pool even though there is no shared storage.

SUMMARY

In a large-scale data center, multiple storage systems coexist in the data center, and the storage systems operate independently. However, in previously existing techniques including U.S. Pat. No. 8,370,833, since characteristics are different in each storage system, a problem arises that the integrated management of the storage pools and storage volumes in the entire data center fails.

In detailed description, when the forms of software and hardware vary, the characteristics of storage systems vary. Even though the forms of software and hardware are the same, when a specific function is valid, or set parameters are different, the characteristics of the storage system vary. In summary, it can be said that storage systems in different types, their characteristics vary.

As described above, when the characteristics of the storage system vary, since the storage management methods by previously existing techniques fail to manage storage pools in the entire data center in integration, creating a storage volume in a suited storage pool corresponding to a storage requirement is not enabled for a variety of storage requirements specified in creating the storage volume.

The present invention is made in consideration of points above, and the present invention is to provide a storage management apparatus, an information system, and a storage management method that can integrate storage pools in multiple storage systems even though the storage systems are in different types and that can create a storage volume in a suited storage pool corresponding to storage requirements.

In order to solve such problems, a first aspect of the present invention is to provide a storage management apparatus that manages an information system in integration in which multiple storage systems are present. The storage management apparatus holds first management information relating to storage pools provided by the storage systems and second management information relating to storage volumes created in the storage pool. The first management information includes characteristic information about the storage pools. The second management information includes requested requirements information that indicates a storage requirements requested for the storage volume and provided requirements information that indicates requirements provided on the storage volume. When creating the storage volume using the requested storage requirements as parameters, the storage management apparatus executes a location destination selection process in which the storage pool that satisfies the storage requirements is selected based on comparison of the storage requirements with the characteristic information held in the first management information, the storage management apparatus creates the storage volume in the storage pool selected by the location destination selection process, and the storage management apparatus adds an entry relating to the created storage volume.

In order to solve such problems, a second aspect of the present invention is to provide an information system including multiple storage systems and a storage management apparatus connected to the multiple storage systems via a network, the storage management apparatus being configured to manage the plurality of storage systems in integration. In the information system, the storage management apparatus holds first management information relating to a storage pool provided by the storage systems and second management information relating to a storage volume created in the storage pool. The first management information includes characteristic information on the storage pool. The second management information includes requested requirements information that indicates a storage requirements requested for the storage volume and provided requirement information that indicates a requirement provided on the storage volume. When creating the storage volume using the requested storage requirements as parameters, the storage management apparatus executes a location destination selection process in which the storage pool that satisfies the storage requirements is selected based on comparison of the storage requirements with the characteristic information held in the first management information, the storage management apparatus creates the storage volume in the storage pool selected by the location destination selection process, and the storage management apparatus adds an entry relating to the created storage volume to the second management information.

In order to solve such problems, a third aspect of the present invention is to provide a storage management method by a storage management apparatus that manages an information system in integration in which multiple storage systems are present. The storage management apparatus holds first management information relating to a storage pool provided by the storage systems and second management information relating to a storage volume created in the storage pool. The first management information includes characteristic information on the storage pool. The second management information includes requested requirements information that indicates a storage requirements requested for the storage volume and provided requirement information that indicates a requirement provided on the storage volume. When creating the storage volume using the requested storage requirements as parameters, the storage management apparatus executes a location destination selection process in which the storage pool that satisfies the storage requirement is selected based on comparison of the storage requirement with the characteristic information held in the first management information, the storage management apparatus creates the storage volume in the storage pool selected by the location destination selection process, and the storage management apparatus adds an entry relating to the created storage volume to the second management information.

According to the present invention, even though storage systems are different in types, storage pools in multiple storage systems can be integrated, and a storage volume can be created in a suited storage pool corresponding to a storage requirement.

BRIEF DESCRIPTION OF THE DRAWINGS

FIG. 3 is a diagram showing a specific example of a storage pool management table;

FIG. 4 is a diagram showing a specific example of a volume management table;

DETAILED DESCRIPTION

In the following, an embodiment of the present invention will be described in detail with reference to the drawings.

Note that the present embodiment does not limit the invention in claims, and all elements and combinations of the elements described in the present embodiment are not necessarily essential for solution of the present invention.

(1) Description of Terms

First, various terms that are used in the present embodiment will be described.

In the present embodiment, a physical storage device (i.e., a storage device that is configured of dedicated hardware) is referred to as a "conventional storage device", unless otherwise specified. A physical computer on which a storage control program is installed (e.g. a general-purpose computer) is referred to as an "SDS". The term "storage device" is used as a term that means both of the conventional storage device and the SDS. For example, in the case in which functions and characteristics that the conventional storage device and the SDS include in common are described, the term "storage device" is used.

The term "the volume" means a storage space that is provided to an initiator, such as a host computer, by a target device, such as a storage device and a memory device. When the initiator issues an I/O (Input/Output) request, i.e., a read request to an area on a volume, a target device that provides the volume reads data from an area on a target device that is associated with that area and returns the data to the initiator.

Note that some storage devices can provide a virtual volume that is formed by a so-called thin provisioning technique to the initiator as the volume. In the present embodiment, a function that provides a virtual volume to the initiator is referred to as a "thin provisioning function".

In the initial state of the virtual volume (immediately after the virtual volume is defined), no memory device is associated with an area on a storage space. At a point in time when the initiator issues a data write request to an area on the storage space, the storage device can dynamically determine a memory device that is associated with that area. The SDS in the present embodiment can provide a virtual volume to the initiator.

A "volume virtualization function" (or sometimes simply referred to as a "virtualization function") is a function that provides a volume of another storage device as an own volume to an initiator device. The volume virtualization function is provided being mounted on a dedicated device, for example, (e.g. referred to as a virtualization appliance). For example, a storage device sometimes includes the volume virtualization function.

(2) Overall Structure of an Information System

Figure 1:
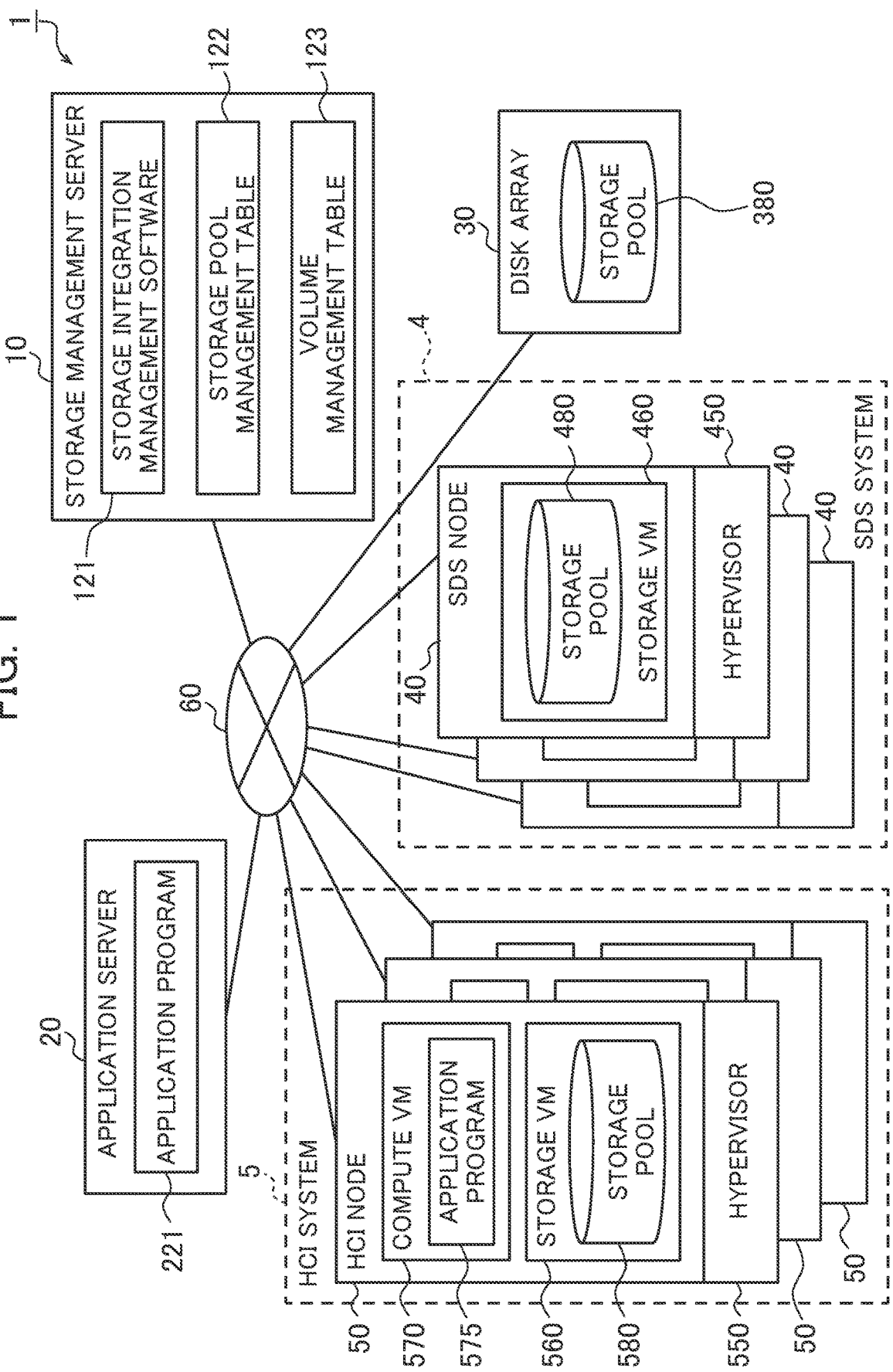
FIG. 1 is a block diagram showing an example configuration of an information system according to an embodiment of the present invention.

FIG. 1 is a block diagram showing an example configuration of an information system according to an embodiment of the present invention.

As shown in FIG. 1, an information system 1 is configured including one or a plurality of application servers 20, a storage management server 10, one or a plurality of disk arrays 30, one or a plurality of SDS systems 4, and one or a plurality of HCI systems 5. The configurations are connected to each other via a network 60. The SDS system 4 is a storage system configured including one or a plurality of SDS nodes 40. The HCI system 5 is a storage system configured including one or a plurality of HCI nodes 50. The information system 1 can be thought as a data center in which a plurality of storage systems in different types coexists, for example.

The application server 20 is a computer on which an application program 221 used by a user is executed, and is an example of a host system. Although the application server 20 may be a general-purpose computer, the application server 20 may be a virtual machine using server virtualization. The application program 221 is a program, such as a database management system, spreadsheet software, or a word processor.

The storage management server 10 is a computer that is used for the management operation of the information system 1 by a user or an administrator of the information system 1 (in the following, simply referred to as a "user"), and corresponds to a storage management apparatus according to the present embodiment. The storage management server 10 is a server that manages the storage systems (the disk array 30, the SDS system 4, and the HCI system 5) of the information system 1, which may be a general-purpose computer or may be a virtual machine using server virtualization. The storage management server 10 has an input device and an output device used when the user performs the management operation of the information system 1. The input device is a keyboard, a mouse, and any other device, for example, and the output device is a display and any other device, for example. Note that a server computer other than the storage management server 10 in the information system 1 may similarly include an input device and an output device.

The disk array 30 is a computer that operates as a storage device for storing data used by the application server 20. The disk array 30 is a conventional storage device, and is a storage device configured of dedicated hardware.

In the SDS system 4, the plurality of SDS nodes 40 is connected to each other via the network between the nodes to form the SDS.

Similarly to the disk array 30, each of the SDS nodes 40 is a computer that operates as a storage device for storing data used by the application server 20. The SDS node 40 may be a general-purpose computer (a server computer), and the SDS nodes 40 included in the SDS system 4 may have the same basic hardware configuration. However, the hardware configuration of each of the server computers is not necessarily completely the same. Specifically, for example, the number of processors (e.g. CPUs (Central Processing Units)), the memory space, and any other parameter of the server computer may be different. In the SDS node 40, the processor of the server computer executes the storage control program, and thus the server computer operates as a storage device. Note that although the SDS node 40 may be a physical computer, the SDS node 40 may be a virtual machine using server virtualization (a storage VM).

In the HCI system 5, the plurality of HCI nodes 50 is connected to each other via the network between the nodes to form the SDS. Note that the SDS formed in the HCI system 5 may be an SDS the same as the SDS formed by the SDS system 4 (the SDS node 40), or may be an SDS formed only of a plurality of HCI nodes 50.

Similarly to the disk array 30 and the SDS node 40, each of the HCI nodes 50 is a computer that operates as a storage device for storing data used by the application server 20. The HCI node 50 may be a general-purpose computer (a server computer), and the HCI nodes 50 included in the HCI system 5 may have the same basic hardware configuration. However, the hardware configuration of each of the server computers is not necessarily completely the same. Specifically, for example, the number of processors, the memory space, and any other parameter of the server computer may be different.

The disk array 30, the SDS system 4, and the HCI system 5 (the SDS functional part in the HCI) create one or more storage pools (storage pools 380, 480, and 580 in FIG. 1), and can define a volume created from the storage pool. The defined volume is provided to the initiator, such as the application server 20. The application server 20 issues a write request to the storage device (the disk array 30, the SDS node 40, and the HCI node 50) that provides the volume, and stores data (e.g. a database table and any other data) generated by the application program 221 on the volume. The application server 20 issues a read request to the storage device (the disk array 30, the SDS node 40, and the HCI node 50) that provides the volume, and reads data from the volume.

Note that at least one of the SDS node 40, the HCI node 50, the application server 20, and the storage management server 10 may be a virtual device that is provided based on a computer resource pool like a cloud infrastructure (e.g. an interface device, a memory, and a processor). The SDS node 40, the HCI node 50, the application server 20, and the storage management server 10 may be present in multiple numbers in the information system 1. In the present embodiment, as shown in FIG. 1 as an example, the description will be made in the configuration in which in the information system 1, one storage management server 10 and one application server 20 are present and pluralities of SDS nodes 40 and HCI nodes 50 are present.

For the network 60, for example, a transmission medium, such as Ethernet (registered trademark) and a fiber channel, is used. The network 60 is used when the application server 20 reads and writes data on the disk array 30 or the SDS as well as the network 60 is used when the storage management server 10 exchanges management operation commands and various pieces of management information with the disk array 30, the SDS node 40, or the HCI node 50 (or the application server 20). Note that as another form, a network that transmits and receives data between the application server 20 and the disk array 30, the SDS node 40, or the HCI node 50 and a network that the storage management server 10 transmits and receives management operation commands, for example, may be separately provided. That is, the network 60 may be one network or may be a plurality of networks.

(3) Detailed Configuration (3-1) Storage Management Server

Figure 2:
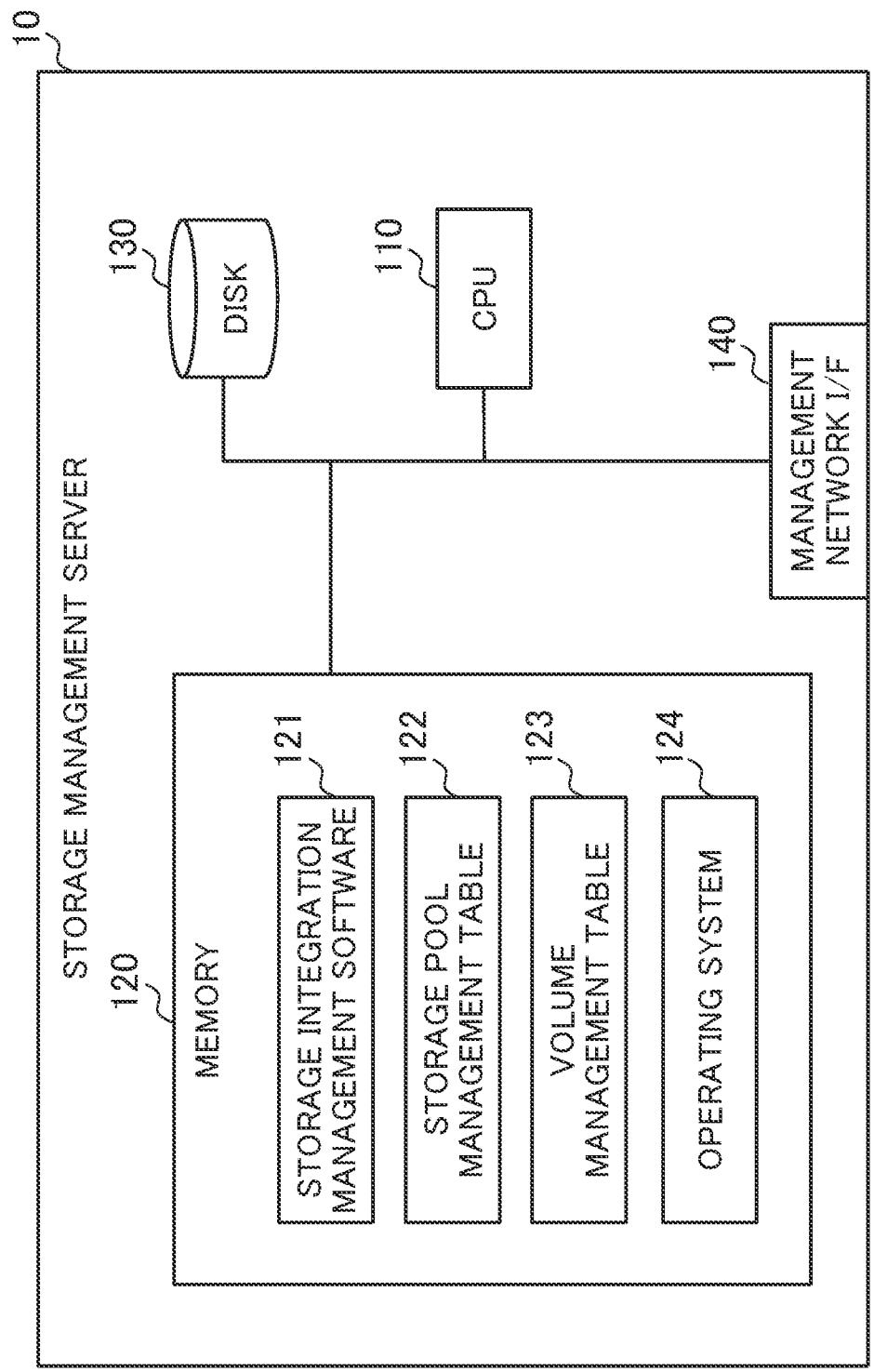
FIG. 2 is a block diagram showing an example configuration of a storage management server.

FIG. 2 is a block diagram showing an example configuration of the storage management server.

As shown in FIG. 2, the storage management server 10 is configured including a memory 120 that is a main storage device, a disk 130, and a management network I/F 140, and a CPU 110 that is a processor connected to these components. The numbers of the components, i.e., the CPU 110, the memory 120, the disk 130, and the management network I/F 140 are not limited, and the number may be one or multiple numbers.

The CPU 110 executes programs loaded on the memory 120. The memory 120 is a volatile memory, such as a DRAM (Dynamic Random Access Memory), on which storage integration management software 121, a storage pool management table 122, a volume management table 123, and an operating system 124 are stored. The disk 130 is a memory device having a non-volatile storage medium, such as a magnetic disk or a flash memory, and used for storing data on the tables (the storage pool management table 122 and the volume management table 123).

Note that the software, the tables, and the like shown in the memory 120 in FIG. 2 are stored on the disk 130 when the storage management server 10 does not operate (when a power supply is in the OFF-state), and may be loaded from the disk 130 on the memory 120 when the storage management server 10 is started. Such behavior is common in all the server computers (i.e., the storage management server 10, the application server 20, the SDS node 40, and the HCI node 50) in the information system 1.

The management network I/F 140 is an interface device that connects the storage management server 10 to the network 60, and has a port that connects a transmission line (network cable) provided between the storage management server 10 and the network 60. Thus, in the following, the network I/F is also referred to as a "port". Note that communication via the port may be wireless communications instead of communication via the transmission line. This is common in all the server computers (i.e., the storage management server 10, the application server 20, the SDS node 40, and the HCI node 50) in the information system 1.

Subsequently, the roles of the programs and the like stored on the memory 120 will be described. Note that in the following description, in the processes executed on the server computers (the storage management server 10, the application server 20, the SDS node 40, and the HCI node 50) in the information system 1, the description is sometimes made using "the program" as a subject for simplifying the description. However, actually, the processor of the server computer executes the program, and the process described on the program is performed. That is, the entity of the processes described using the program as a subject is the processor that actually executes the program. This is common in all the server computers (i.e., the storage management server 10, the application server 20, the SDS node 40, and the HCI node 50) in the information system 1.

The storage integration management software 121 is a program that manages the plurality of storage systems. Specifically, examples of management performed using the storage integration management software 121 include operation, such as the definition and removal of a storage volume, monitoring of the state of the storage system, and any other operation.

The storage pool management table 122 is a table that holds information on storage pools provided by the storage systems. The detail of the storage pool management table 122 will be described later with reference to FIG. 3. Note that the storing method for the storage pool management table 122 may be RDBMS (Relational DataBase Management System), or may be a file stored on a file system.

The volume management table 123 is a table that holds information on a storage volume created on the storage pools. The detail of the volume management table 123 will be described later with reference to FIG. 4.

The operating system 124 is a program that has an input-output control function, a read write control function on the disk 130, the memory 120, and any other device, and any other function and that provides these functions to other programs.

Here, the tables (the storage pool management table 122 and the volume management table 123) held on the storage management server 10 will be described more in detail using specific examples.

FIG. 3 is a diagram showing a specific example of the storage pool management table. As described above, the storage pool management table 122 is a table that holds predetermined pieces of information on storage pools provided by the storage systems including characteristic information on a storage pool.

In the case of FIG. 3, the storage pool management table 122 is a data table composed of a storage pool ID 1220, a storage ID 1221, a storage type 1222, a provided protocol 1223, a provided function 1224, a data protection level 1225, a performance 1226, a total space 1227, a used space 1228, and a free space 1229, and holds one entry for one storage pool. In the following, information held on each item in the storage pool management table 122 in FIG. 3 will be described in detail.

The storage pool ID 1220 is an identifier (ID) that identifies a storage pool.

The storage ID 1221 is an identifier that identifies a storage system. Examples of specific identifiers to be the storage ID 1221 may include the identifier of the disk array 30 and the identifier of the SDS or may be the identifiers of the SDS node 40 and the HCI node 50 that form the SDS.

The storage type 1222 is information that indicates the form of the storage system. In this example, any one of "Disk array" that means a disk array, "the SDS" that means the SDS formed by the SDS node, and "the SDS (the HCI)" that means the SDS formed by the HCI node is indicated.

The provided protocol 1223 indicates a protocol supported by the storage system. For example, as the protocol of a block storage, "FC" or "iSCSI" is indicated. Note that for example, another protocol may be a protocol for a file storage or an object storage.

The provided function 1224 indicates functions that can be enabled among storage functions in the storage pool supported by the storage system. Examples of specific functions include snapshot, clone, compression, deduplication, remote copy, encryption, tiering, and any other function.

The data protection level 1225 indicates the redundancy of data supported by the storage system. The redundancy of data can be expressed by data and the number of parities, for example. Note that the type of data redundancy may be data redundancy between the nodes or may be data redundancy between a plurality of disks in the nodes. As data redundancy between the nodes, a data redundancy method, such as replication and erasure coding, may be included. Data redundancy between a plurality of disks in the node may be RAID (Redundant Arrays of Inexpensive Disks), for example.

The performance 1226 indicates a processing performance including throughput values. Specifically, for example, "iops (or kiops)" that indicates the I/O number of a certain data size per second is shown. The I/O number indicated on the performance 1226 may be the performance value of read I/O, the performance value of write I/O, or may be the performance value of read I/O and write I/O that are mixed. The performance index may be a response performance instead of the throughput (or in addition to the performance). The performance value may be indicated by a mean value, a maximum value, and a minimum value, or may be indicated by a relative value and any other value from a reference performance.

The total space 1227 indicates the size (capacity) of the storage pool. The used space 1228 indicates a space already allocated to the storage volume. The used space 1228 may be expressed by the absolute value of the space, or may be expressed by a use ratio to the total space. The free space 1229 indicates a space that is not allocated to the storage volume. The free space 1229 may be expressed by the absolute value of the space, or may be expressed a vacancy ratio to the total space.

As described above, the storage pool management table 122 holds information on various attributes relating to the storage pool, and includes characteristic information that indicates the characteristics of the storage pool. However, the attributes that the storage pool management table 122 can hold as characteristic information on the storage pool are not limited to the examples shown in FIG. 3. For example, an attribute, such as Quality of Service (QoS), provided using the storage pool may be included.

FIG. 4 is a diagram showing a specific example of the volume management table. As described above, the volume management table 123 is a table that holds information on a storage volume created on the storage pools, including information that indicates a storage requirement requested to a storage volume (request requirement information) and information that indicates a requirement provided in the storage volume (provided requirement information). Note that the storage volume is provided by cutting out a specific area from the storage pool.

In the case of FIG. 4, the volume management table 123 is a data table composed of a volume ID 1230, a storage pool ID 1231, a used protocol 1232, a used volume size 1233, a used function 1234, a requested protocol 1235, a requested volume size 1236, a requested function 1237, a requested availability 1238, and a requested performance 1239, and holds one entry for one storage volume. In the following, information held on the items in the volume management table 123 in FIG. 4 will be described in detail.

The volume ID 1230 is an identifier (ID) that identifies a storage volume created in the storage pool.

The storage pool ID 1231 is an identifier that indicates a storage pool which is the creation destination of the storage volume, corresponding to the storage pool ID 1220 in the storage pool management table 122 shown in FIG. 3.

The used protocol 1232 indicates a protocol that is used for the access of the storage volume. The protocol that can be described in the used protocol 1232 is similar to the provided protocol 1223 in the storage pool management table 122 shown in FIG. 3, and the description is omitted.

The used volume size 1233 indicates the size of the storage volume.

The used function 1234 indicates a function used by the storage volume in the functions provided by the storage pool that is the creation destination of the storage volume (the storage pool identified by the storage pool ID 1231). The function that can be described in the used function 1234 is similar to the provided function 1224 in the storage pool management table 122 shown in FIG. 3, and the description is omitted.

In the volume management table 123 in FIG. 4, the items in the used protocol 1232 to the used function 1234 are information that indicates a requirement which is presently provided on the storage volume (provided requirement information). On the other hand, the items below (the requested protocol 1235 to the requested performance 1239) are information that indicates a storage requirement specified and requested by the user (or the application program) when the storage volume is created, for example, (request requirement information).

The requested protocol 1235 indicates a protocol specified by a storage requirement. The requested volume size 1236 indicates the size of a storage volume requested by a storage requirement. The requested function 1237 indicates a function usable in a storage volume (a storage pool) requested by a storage requirement.

The requested availability 1238 indicates reliability to a storage volume (a storage pool) requested by a storage requirement. Specific examples of reliability may be a guaranteed operation rate by percentage, or may be values, such as mean time between failure (MTBF) or mean time to recovery (MTTR).

The requested performance 1239 indicates the performance of a storage volume (a storage pool) requested by a storage requirement, and indicates the performance requested by the application program that uses the storage volume. The performance that can be described in the requested performance 1239 is similar to the performance 1226 in the storage pool management table 122 shown in FIG. 3, and the description is omitted.

As described above, the volume management table 123 holds request requirement information and provided requirement information relating to the existing storage volumes. However, the attributes of information that the volume management table 123 can hold are not limited to the examples in FIG. 4. For example, a request value, such as quality of service (QoS), may be included.

(3-2) SDS System

Figure 5:
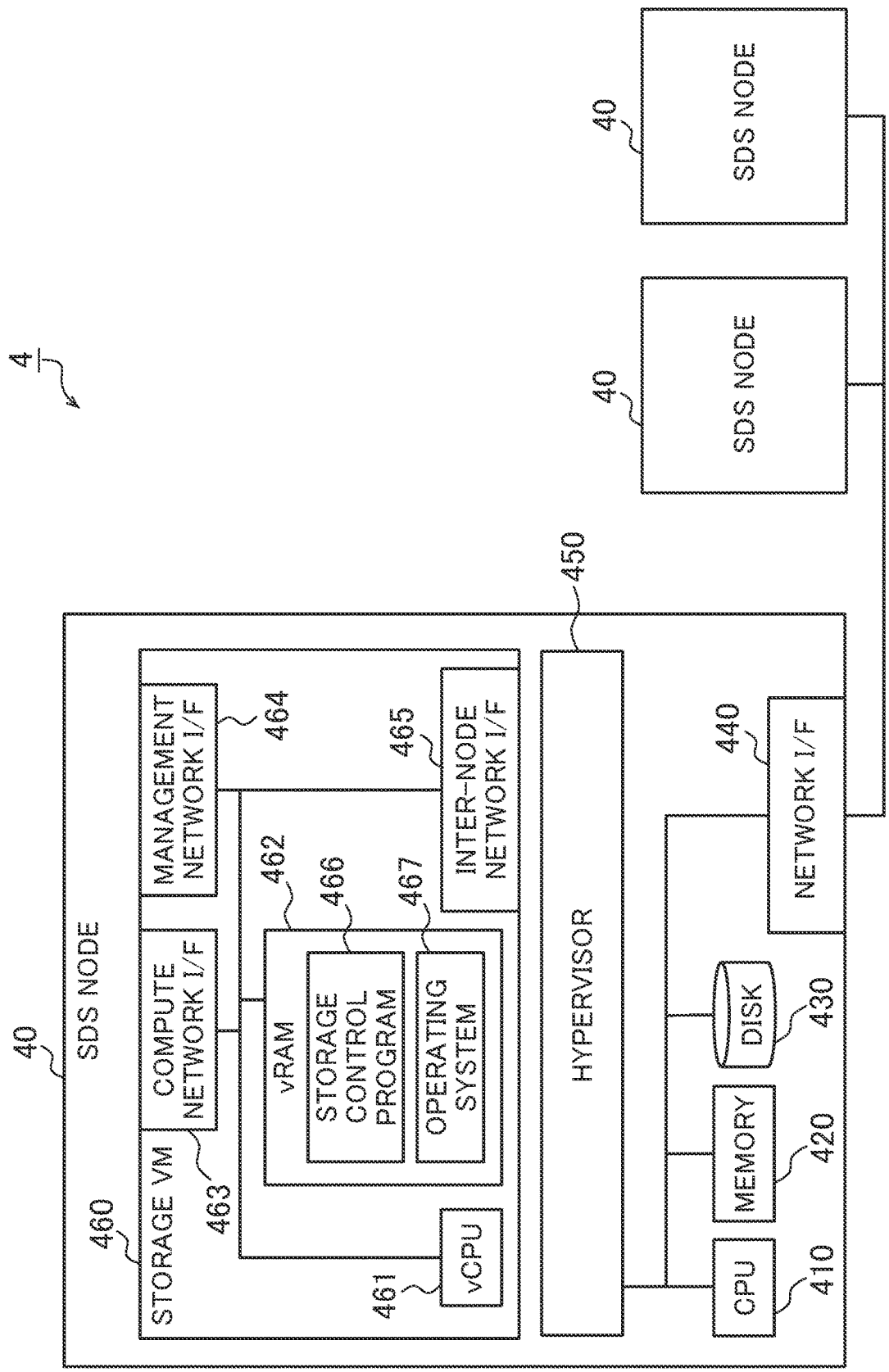
FIG. 5 is a block diagram showing an example configuration of an SDS system.

FIG. 5 is a block diagram showing an example configuration of the SDS system. In FIG. 5, an example configuration of the SDS node 40 is specifically shown in detail.

As illustrated in FIG. 5, the SDS node 40 is configured including a memory 420 that is a main storage device, a disk 430, a network I/F 440, a processor (CPU 410) connected to these components, a hypervisor 450, and a storage VM 460. Among these components, the numbers of the CPU 410, the memory 420, the disk 430, and the network I/F 440 are not limited, and the number may be one or multiple numbers.

The CPU 410 executes programs loaded on the memory 420. The memory 420 is a volatile memory, such as a DRAM. The disk 430 is a memory device having a non-volatile storage medium, such as a magnetic disk or a flash memory, and is used for storing data written by the application server 20 or a compute VM 570 in the HCI node 50.

The hypervisor 450 is software that enables sharing physical resources, i.e., the CPU 410, the memory 420, the disk 430, and the network I/F 440 by a plurality of virtual machines (VMs). In the present embodiment, as an example, server virtualization is used in the SDS node 40, and the hypervisor 450 operates the storage VM 460 that is a virtual machine.

The storage VM 460 has a virtual CPU (vCPU) 461 and a virtual memory (vRAM) 462 that are virtualized by the hypervisor 450, a compute network I/F 463, a management network I/F 464, and an inter-node network I/F 465. The vRAM 462 has a storage control program 466 and an operating system 467.

The storage control program 466 is a program that causes the SDS node 40 (i.e., the server computer) to function as a storage device. Specifically, for example, the SDS node 40 can provide one or more volumes to the initiator, such as the application server 20, by the operation of the storage control program 466. In addition to this, the SDS node 40 performs processes, for example, in which the SDS node 40 accepts an I/O request (a read request or a write request) from the initiator and returns data to the address specified by the read request to the initiator or the SDS node 40 stores write data specified by the write request on the volume.

Note that although the conventional storage device has functions other than providing volumes, such as crating a mirror copy of a volume and any other function, the storage control program 466 in the SDS may be a program that similarly implements functions in the SDS node 40 other than providing volumes.

The storage control program 466 may reserve an area for data, to which the application server 20 frequently makes access, on the vRAM 462.

The compute network I/F 463 is a network that is connected to the application server 20 and that is used for data read and write. The management network I/F 464 is a network that accepts a request from the storage management server 10. The inter-node network I/F 465 is a network that connects the plurality of SDS nodes 40. In the SDS system 4, the SDS nodes 40 are connected to each other via the inter-node network I/F 465 to form the SDS. Note that for these network I/Fs, physically different networks may be used, or these network I/Fs may be virtual networks by the virtual network function of the hypervisor 450.

The SDS node 40 may have a data maintaining unit that prevents the loss of data held on the memory 420 (or the vRAM 462) when a failure, such as a power failure. Specifically, for example, the SDS node 40 has a battery, and can maintain data on the memory 420 using electric power supplied from the battery when a power failure occurs.

(3-3) HCI System

Figure 6:
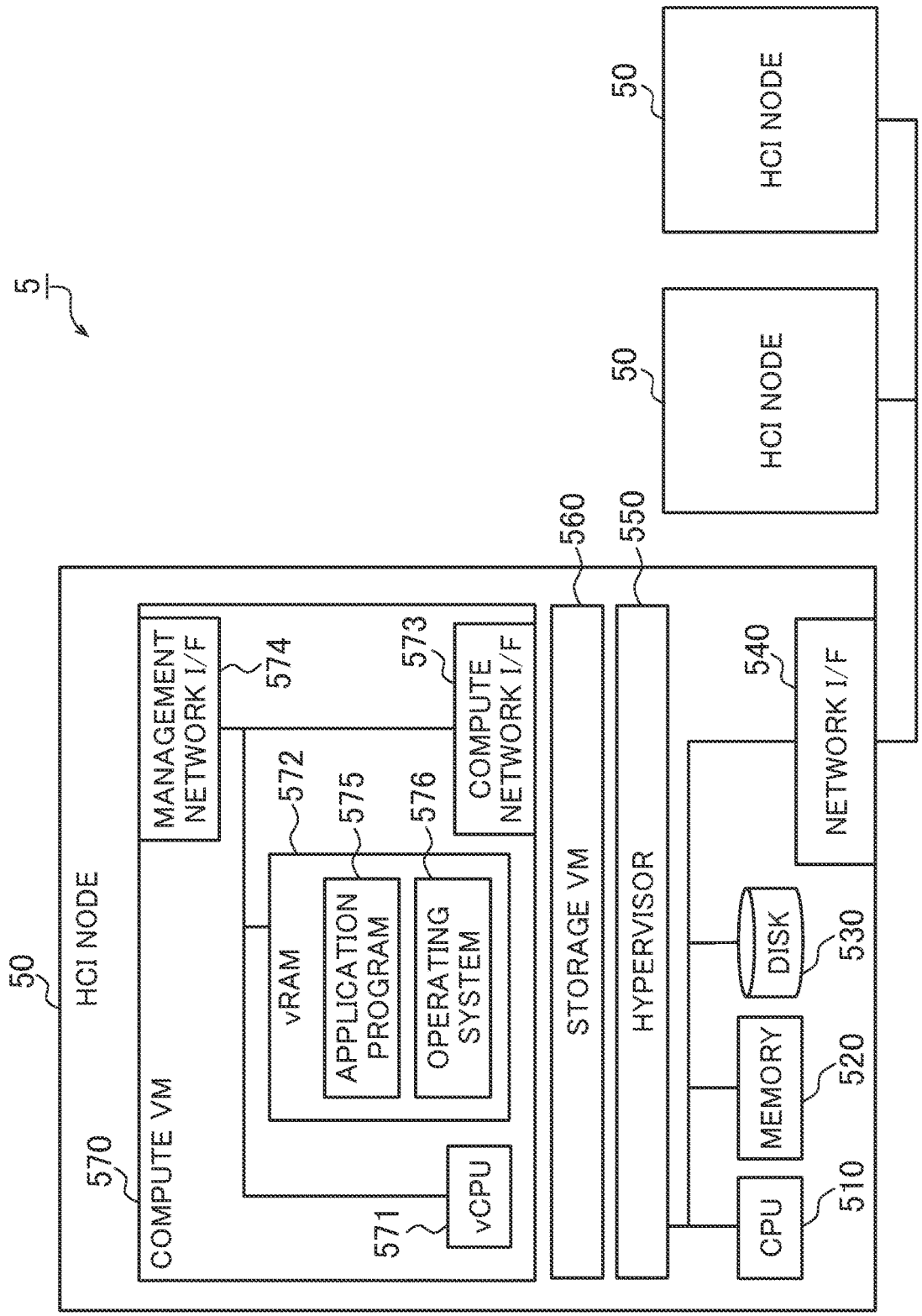
FIG. 6 is a block diagram showing an example configuration of an HCI system.

FIG. 6 is a block diagram showing an example configuration of the HCI system. In FIG. 6, an example configuration of the HCI node 50 is specifically shown in detail.

As illustrated in FIG. 6, the HCI node 50 is configured including a memory 520 that is a main storage device, a disk 530, a network I/F 540, a processor (CPU 510) connected to these components, a hypervisor (the hypervisor) 550, and a storage VM 560. Among these components, the numbers of the CPU 510, the memory 520, the disk 530, and the network I/F 540 are not limited, and the number may be one or multiple numbers.

The CPU 510 executes programs loaded on the memory 520. The memory 520 is a volatile memory, such as a DRAM. The disk 530 is a memory device having a non-volatile storage medium, such as a magnetic disk or a flash memory, and is used for storing data written from the compute VM 570 or the application server 20.

The hypervisor 550 is software that enables sharing physical resources, i.e., the CPU 510, the memory 520, the disk 530, and the network I/F 540 by a plurality of virtual machines (VMs). In the present embodiment, as an example, server virtualization is used in the HCI node 50, and the storage VM 560 and the compute VM 570 that are virtual machines are operated by the hypervisor 550.

The configuration of the storage VM 560 may be similar to the configuration of the storage VM 460 shown in FIG. 5, and the description is omitted.

The compute VM 570 has a virtual CPU (vCPU) 571 and a virtual memory (vRAM) 572 that are virtualized by the hypervisor 550, a compute network I/F 573, and a management network I/F 674. The vRAM 572 has an application program 575 and an operating system 576.

The compute network I/F 573 is a network that is connected to the storage system and that is used for data read and write. The management network I/F 574 is a network that accepts a request from the storage management server 10. Note that for these network I/Fs, physically different networks may be used, or these network I/Fs may be virtual networks by the virtual network function of the hypervisor 550.

(3-4) Disk Array

Figure 7:
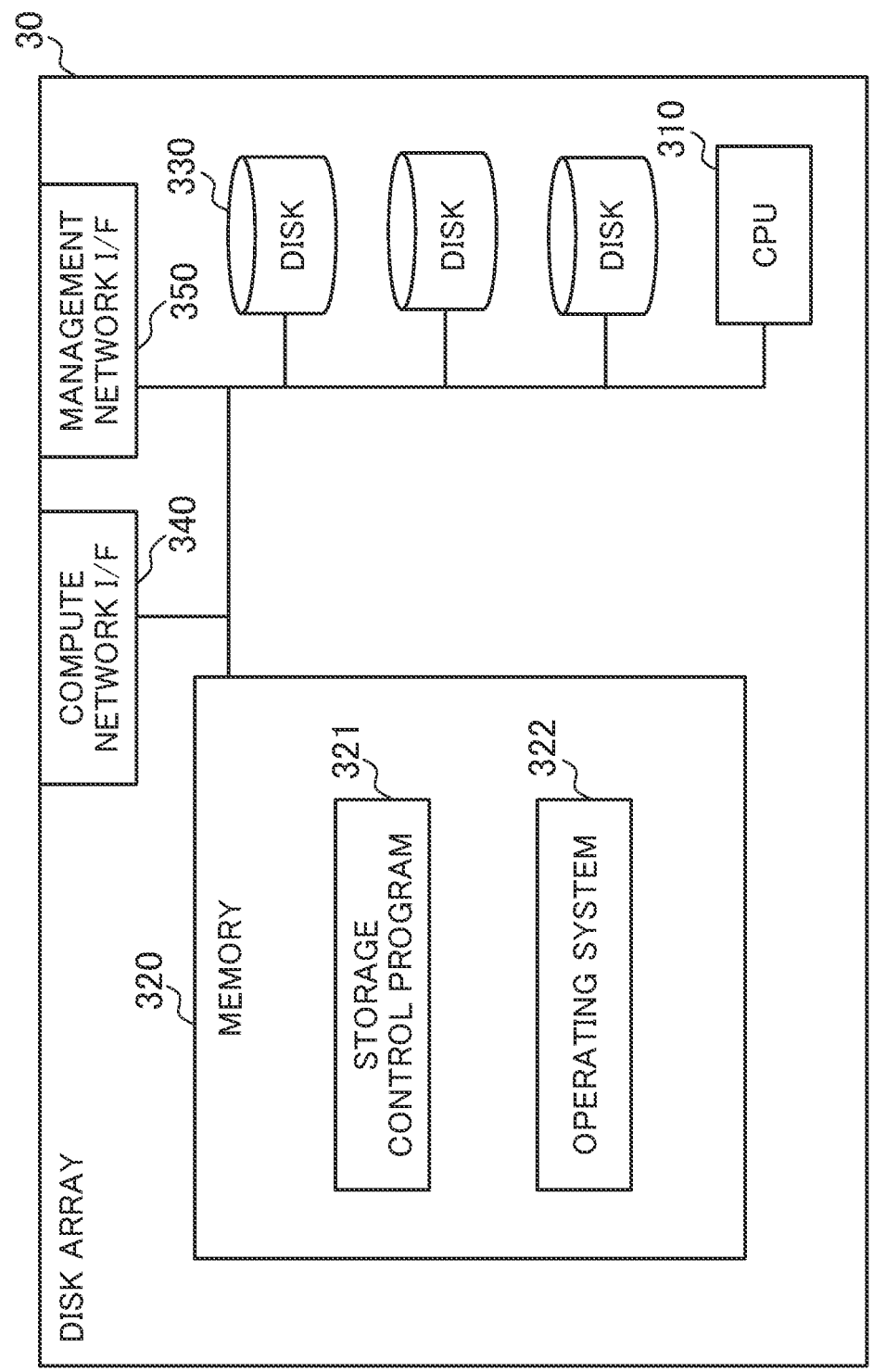
FIG. 7 is a block diagram showing an example configuration of a disk array.

FIG. 7 is a block diagram showing an example configuration of the disk array.

As illustrated in FIG. 7, the disk array 30 is configured including a memory 320 that is a main storage device, a disk 330, a compute network I/F 340, a management network I/F 350, and a processor (CPU 510) connected to these components. The numbers of the components, i.e., the CPU 310, the memory 320, the disk 330, the compute network I/F 340, and the management network I/F 350 are not limited, and the number may be one or multiple numbers.

The CPU 310 executes programs loaded on the memory 320. The memory 320 is a volatile memory, such as a DRAM, on which the storage control program 321 and the operating system 322 are stored. The disk 330 is a memory device having a non-volatile storage medium, such as a magnetic disk or a flash memory, and is used for storing data written from the compute VM 570 or the application server 20.

(4) Storage Management Process

In the present embodiment, in the information system 1 described above, the storage management server 10 can manage a plurality of storage systems different in types (the disk array 30, the SDS system 4, and the HCI system 5) in integration. For example, a storage volume can be created in a suited storage pool corresponding to a storage requirement. In the following, a storage management process performed by such a storage management apparatus (the storage management server 10) will be described in detail.

(4-1) Storage Pool Creation Process

Figure 8:
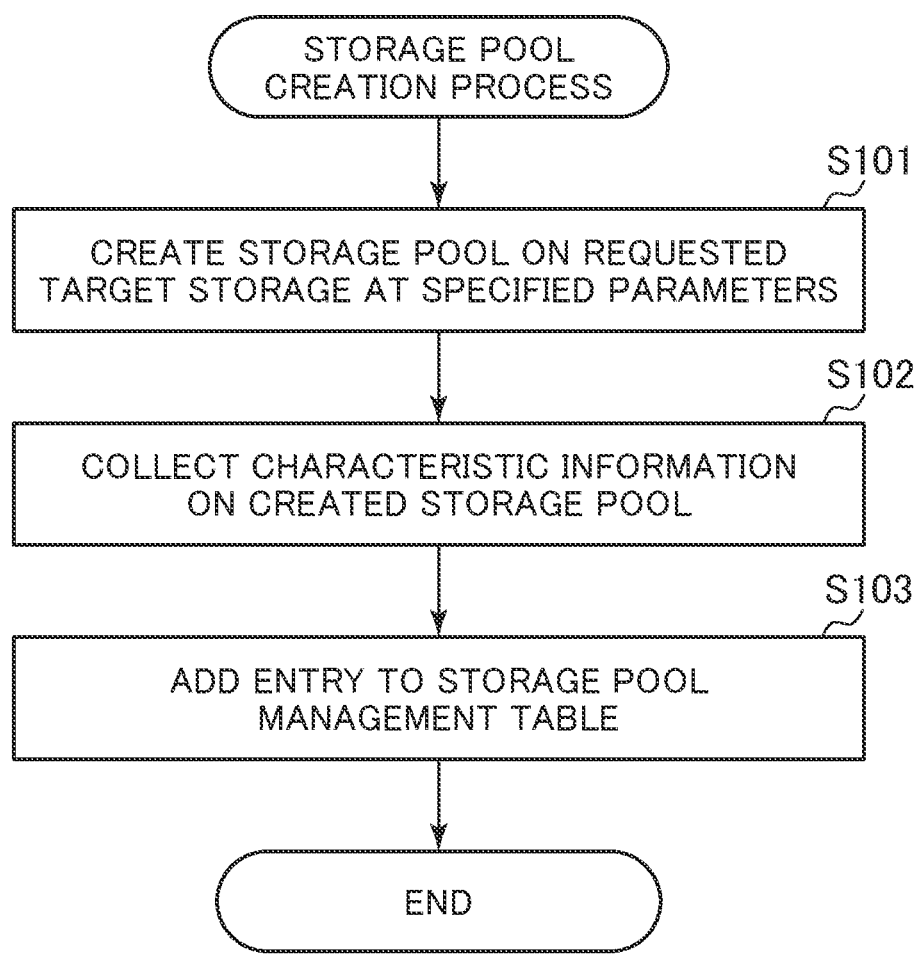
FIG. 8 is a flowchart showing example process procedures of a storage pool creation process.

FIG. 8 is a flowchart showing example process procedures of a storage pool creation process. The storage pool creation process is a process that is executed when the user (e.g. the storage administrator) requests the storage management server 10 to create a storage pool after a storage system is newly introduced, and the storage pool creation process is executed by the storage integration management software 121 of the storage management server 10. When the storage pool creation process is started, the user specifies a storage that is a request target for creating a storage pool, and requests the storage management server 10 to create a storage pool.

According to FIG. 8, first, the storage integration management software 121 of the storage management server 10 creates a storage pool on a request target storage specified by the user at parameters specified by the user (Step S101). The parameters that are specified at this time include a data protection level or functions to be enabled, for example.

Subsequently, the storage integration management software 121 collects predetermined pieces of information relating to the storage pool created in Step S101 (Step S102). Specifically, the predetermined pieces of information to be collected in Step S102 correspond to information on items held in the storage pool management table 122 illustrated in FIG. 3, including characteristic information on the storage pool.

Lastly, the storage integration management software 121 adds the entry of the storage pool created in Step S101 to the storage pool management table 122 using the information collected in Step S102, returns the completion of the storage pool creation process to the user (Step S103), and ends the process.

As described above, the storage pool creation process is described. However, from the viewpoint of management of the characteristic information on the storage pool by the storage pool management table 122, it can be said that the process (specifically processes in Steps S102 to S103) is an example process in the case in which a necessity arises to newly add an entry to the storage pool management table 122.

(4-2) Storage Volume Creation Process

Figure 9:
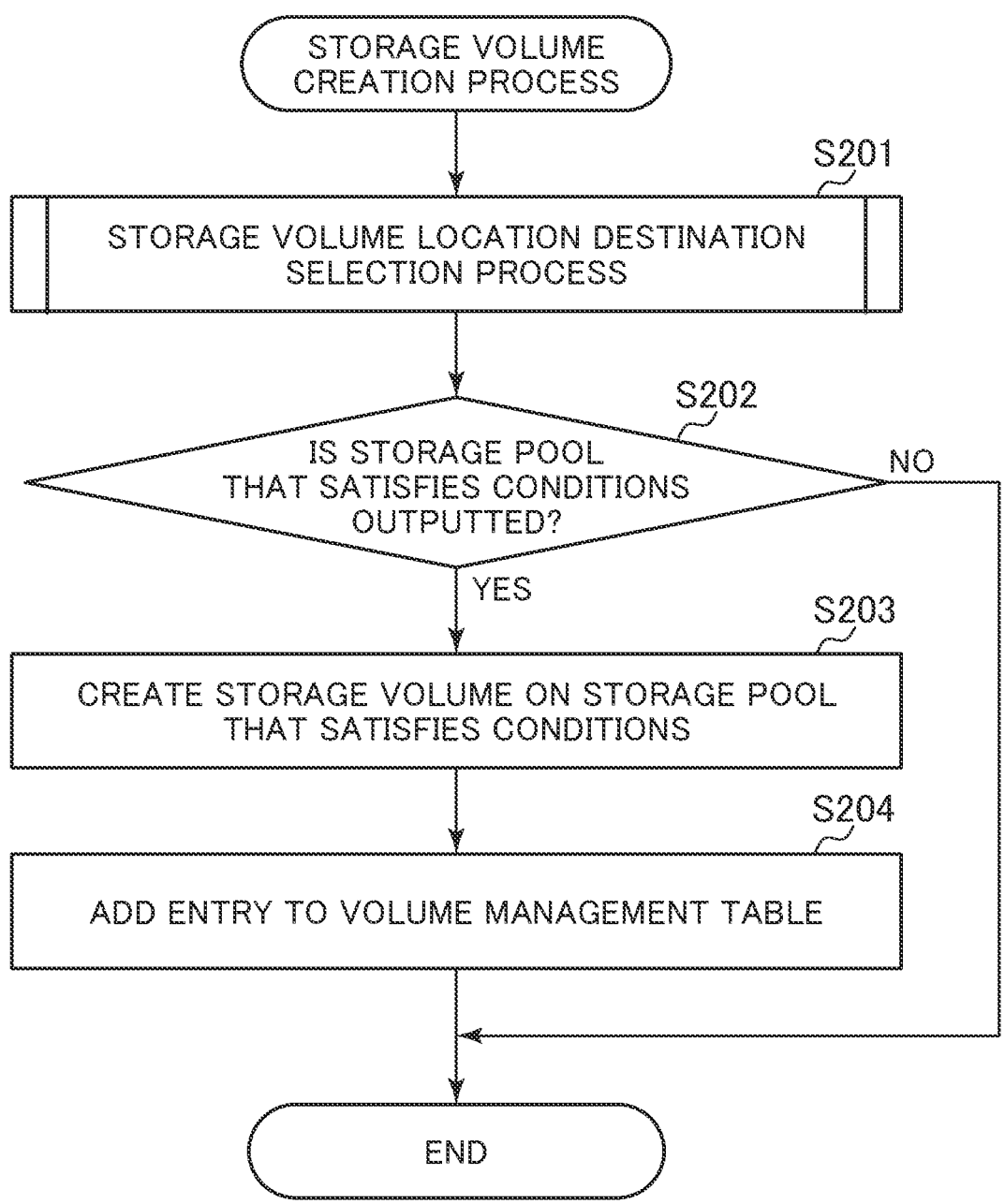
FIG. 9 is a flowchart showing example process procedures of a storage volume creation process.
Figure 10:
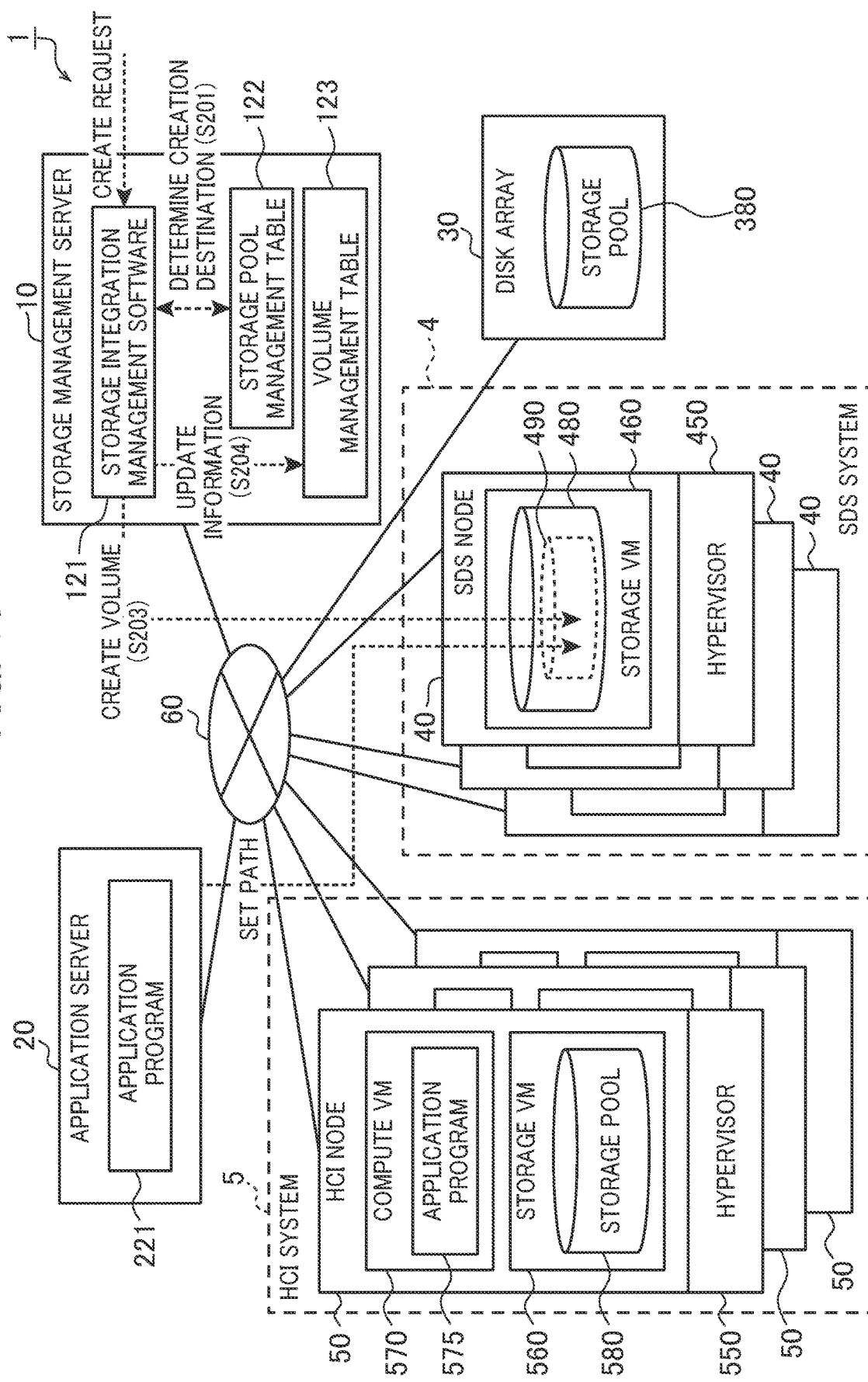
FIG. 10 is a diagram illustrating an image of the storage volume creation process.

FIG. 9 is a flowchart showing example process procedures of a storage volume creation process. The storage volume creation process is a process that is executed in the case in which a storage volume is newly created. The storage volume creation process is started in which the user (e.g. the storage administrator) specifies a storage requirement and requests the storage management server 10 to create a storage volume. FIG. 10 is a diagram illustrating an image of the storage volume creation process. In FIG. 10, process flows of the storage volume creation process are indicated by arrowed broken lines. Note that step numbers shown in FIG. 10 correspond to the step numbers in FIG. 9.

First, as pre-processing for the storage volume creation process, the user defines a storage requirement necessary for the application program 221 (or the application program 575) to determine a storage on which data is stored. The user requests the storage management server 10 to create a storage volume using the defined storage requirement as a parameter.

Here, the interface used for requesting the storage volume creating request may be a GUI (Graphical User Interface) provided by the storage management server 10, a CLI (Command Line Interface), or may be a tool using an API (Application Programming Interface), for example. The storage requirement can include a plurality of items (attributes). For example, the storage requirement includes a protocol, a function, availability, a data protection level, a performance, a volume size, and any other item. The format of the storage requirement is freely given, and may be a format including CSV (Comma-Separated Values), JSON (JavaScript (registered trademark) Object Notation), or XML (eXtensible Markup Language), for example.

The process procedures of the storage volume creation process will be described along FIG. 9.

Upon accepting the storage volume creating request described in pre-processing, the storage integration management software 121 of the storage management server 10 executes a storage volume location destination selection process using the storage requirement specified by the user as an input (Step S201).

The storage volume location destination selection process in Step S201 is a process in which the storage requirement inputted as a parameter of the storage volume creating request is compared with the characteristic information on the storage pools held in the storage pool management table 122 to select (output) a storage pool that satisfies the storage requirement. The process procedures will be described later with reference to FIG. 11.

Subsequently, the storage integration management software 121 determines whether a storage pool that satisfies the condition (the storage requirement) is outputted (selected) by the storage volume location destination selection process in Step S201 (Step S202).

In the case in which a storage pool that satisfies the storage requirement is selected by the storage volume location destination selection process (YES in Step S202), the storage integration management software 121 instructs the storage system that provides the storage pool to create a storage volume with a parameter specified, and the storage system that accepts the instruction creates a storage volume on the instructed storage pool at the parameter (Step S203). The parameter specified in Step S203 includes, in addition to specifying the storage pool, for example, the size of the storage volume, a function to be enabled, a protocol, and any other parameter. In the case of FIG. 10, an image is shown in which a storage volume 490 is created in the storage pool 480 provided by the storage VM 460 of the SDS node 40.

After the process in Step S203 is performed, the storage integration management software 121 adds the entry of the storage volume created in Step S203 to the volume management table 123, returns the completion of the storage volume creation process to the user (Step S204), and ends the process. As shown in FIG. 4, the entry that is added to the volume management table 123 in Step S204 includes the ID of the created storage volume (the volume ID 1230), the protocol (the used protocol 1232), the size of the storage volume (the used volume size 1233), the function that is enabled (the used function 1234), the requested availability 1238, and the requested performance 1239 and the like.

Note that in the case in which the plurality of storage pools satisfies the condition (the storage requirement) in Step S202, a storage pool, in which a storage volume is created in Step S203, only has to be determined according to a predetermined determination method. As a predetermined determination method, for example, a storage volume may be created in a storage pool having a largest free space. For example, a method may be provided in which a coefficient is multiplied for each of the element requirements of the storage requirement and a storage volume is created in a storage pool having the highest total value. For example, a method may be provided in which a storage pool is selected by round robin to in turn create a storage volume, or a method may be provided in which the plurality of storage pools may be outputted to the user and the user selects a storage pool.

On the other hand, in the case in which a storage pool that satisfies the storage requirement is not outputted in the determination in Step S202 (NO in Step S202), creating a storage volume fails under the condition in which the storage requirement is satisfied, and thus the storage volume creation process is ended. At this time, an error, for example, may be returned to the user side, notifying the user that no storage pool which satisfies the storage requirement is present.

After the end of the storage volume creation process shown in FIG. 9, the user who accepts the completion of creating a storage volume establishes a path between the application server 20 (or the compute VM 570) and the storage system that has created a storage volume (e.g. in the case of FIG. 10, the SDS node 40) as post-processing, and the application program 221 of the application server 20 (or the application program 575 of the compute VM 570) starts data read and write with the storage volume. Specifically, establishing the path is a process of establishing an initiator and a target by "iSCSI", for example.

Note that in the case of the HCI node 50, as a method of establishing a path between the compute VM 570 and the storage system, any one of two methods below may be adopted.

A first method is an example of a method of establishing a path in the case in which a storage volume is created in the storage pool of any one storage system (the disk array 30, the SDS system 4, and the HCI system 5) of the information system 1. In the first method, a path is established to the storage system that has created a storage volume (the disk array 30, the SDS node 40, and the HCI node 50) by the compute VM 570.

A second method is an example of a method of establishing a path in the case in which a storage volume is created in a storage pool in the SDS. The compute VM 570 at this time establishes a path to the storage VM 560 in the same node (the HCI node 50), and the storage VM 560 transfers data to the node in which a storage volume is created.

The transfer by the storage VM 560 in the second method will be described in detail. First, in the case in which the node in which the storage volume is created is the HCI node 50 of the storage VM 560 itself, the storage VM 560 directly exchanges data read and write to the compute VM 570. On the other hand, in the case in which the node, in which the storage volume is created, is another HCI node 50 in the HCI system 5, the storage VM 560 transfers data between the HCI nodes for data read and write. When the storage control software of the HCI node 50 and the SDS node 40 (e.g. the storage control program 466 shown in FIG. 5) has compatibility, the storage VM 560 can also transfer data to the storage volume created in the SDS node 40.

(4-2-1) Storage Volume Location Destination Selection Process

Figure 11:
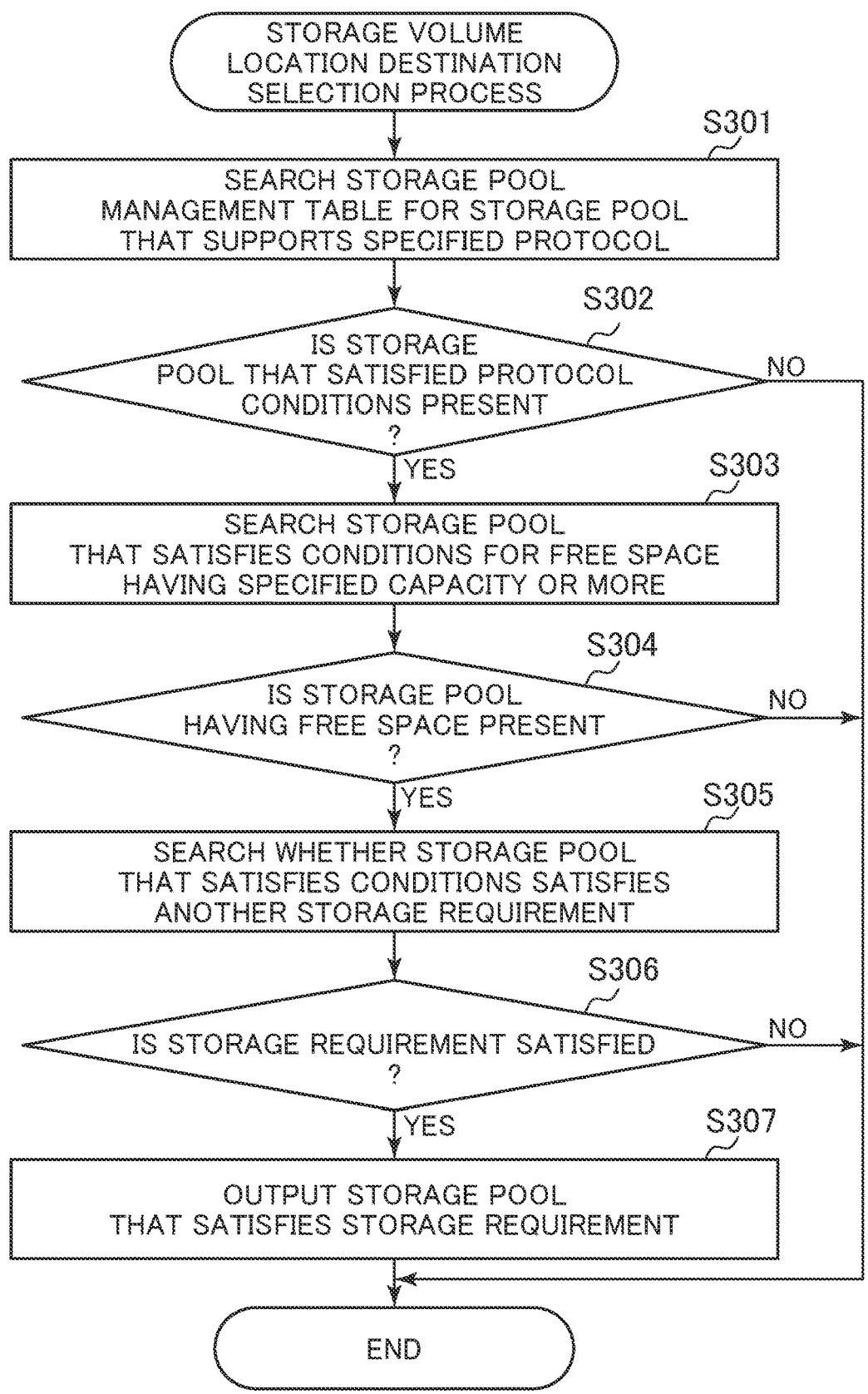
FIG. 11 is a flowchart showing example process procedures of a storage volume location destination selection process.

FIG. 11 is a flowchart showing example process procedures of the storage volume location destination selection process. The storage volume location destination selection process is a process of selecting a storage pool that satisfies the storage requirement based on the storage requirement of the storage volume inputted as a parameter, and is a process that is executed by the storage integration management software 121 of the storage management server 10. The storage volume location destination selection process is invoked in the storage volume creation process (Step S201) shown in FIG. 9 and also invoked in a storage volume relocation process (Step S603) shown in FIG. 14, described later.

According to FIG. 11, first, the storage integration management software 121 makes a reference to the storage pool management table 122 to search for a storage pool that supports the protocol specified by the storage requirement (Step S301).

Subsequently, the storage integration management software 121 determines whether a storage pool that satisfies the specifying condition for the protocol is present by the search in Step S301 (Step S302). In the case in which an affirmative determined result is obtained in Step S302 (YES in Step S302), the process goes to Step S303. On the other hand, in the case in which a negative determined result is obtained in Step S302 (NO in Step S302), selecting the storage pool that satisfies the storage requirement fails, a storage volume location destination selection failure is returned, and the process is ended. The notification of the storage volume location destination selection failure tells that selecting a storage pool that satisfies the storage requirement fails, and information indicating which requirement of the storage requirement is determined as a failure may be added. This is similarly applied in the case in which a negative determined result is obtained in other selection processes (Steps S304 and S306).

In Step S303, the storage integration management software 121 makes reference to the storage pool management table 122 to make a search whether a free space with a specified space or more under the storage requirement is present in the storage pool that satisfies the condition for the protocol in Step S302. In Step S304, as a result of the search, the storage integration management software 121 determines whether a storage pool having a free space with a specified space or more under the storage requirement is present. In the case in which an affirmative determined result is obtained in the determination in Step S304 (YES in Step S304), the process goes to Step S305. On the other hand, in the case in which a negative determined result is obtained in the determination in Step S304 (NO in Step S304), the storage volume location destination selection failure is returned, and the process is ended.

In Step S305, the storage integration management software 121 makes reference to the storage pool management table 122 to make a search whether the storage pool that satisfies the condition for the free space in Step S304 satisfies another requirement specified by the storage requirement. In Step S306, as a result of the search in Step S305, the storage integration management software 121 determines whether the storage pool satisfies the storage requirement. In the case in which an affirmative determined result is obtained in the determination in Step S306 (YES in Step S306), the process goes to Step S307. On the other hand, in the case in which a negative determined result is obtained in the determination in Step S306 (NO in Step S306), the storage volume location destination selection failure is returned, and the process is ended.

In the case of performing the process in Step S307, the storage pool that satisfies all the specified storage requirements is selected through the determinations in Steps S302, S304, and S306 described above. Therefore, in Step S307, the storage integration management software 121 outputs the selected storage pool as the storage pool that satisfies the storage requirement, and ends the process.

As described above, by performing the storage volume location destination selection process, the storage integration management software 121 can search for the storage pool that satisfies the specified storage requirement based on the characteristic information on the storage pools held in the storage pool management table 122, and can select (output) the appropriate storage pool.

Note that the storage volume location destination selection process in the present embodiment is not limited to the process procedures in FIG. 11, and processes below may be performed.

For example, in the storage pools that satisfy the condition for the protocol in Step S302, the process in Step S303 may be skipped on the storage pool in which the storage volume is already created. This is because in the case in which the storage volume is already disposed and the size of the storage volume is unchanged, the determination on the free space is unnecessary to the storage pool.

For example, in Step S306, in the case in which an affirmative determined result is obtained in a plurality of storage pools, i.e., in the case in which a plurality of storage pools that satisfies the storage requirement is found, as a result of the storage volume location destination selection process, the plurality of storage pools may be outputted, or one or a predetermined number of upper limit of storage pools may be outputted using a predetermined determination method. As specific examples of the determination method, storage pools to be outputted may be determined in order of large free spaces, or storage pools to be outputted may be in turn determined by round robin. Alternatively, the storage pool to be outputted may be determined by the priority level calculated by weighting for each of requirements that constitutes the storage requirement. At this time, a predetermined requirement may be used for determination of the priority level, and the other requirements may be excluded from the determination of the priority level. Examples of predetermined requirements of higher priority can include a space, a performance, or availability. A requirement of higher priority or weight may be specified by the user or the application in the storage requirements.

In the storage volume location destination selection process illustrated in FIG. 11, the selection process is performed step by step to the element requirements included in the storage requirement, such as the protocol in Step S302, the free space in Step S304, and other requirements in Step S306. However, the order of execution of these selection processes is not limited to the example shown in FIG. 11, and the order may be changed to a given order. The selection process is not performed step by step, and the selection process may be collectively performed to all the element requirements included in the storage requirement.

In the case of the storage volume location destination selection process described above, the storage pool that is finally selected is limited to the storage pool that satisfies all the element requirements of the storage requirement. However, the present embodiment is not limited to this. For example, a configuration may be provided in which the element requirements of the storage requirement are separated into a compulsory requirement and a desired requirement, and the necessary conditions for a storage pool to be selected are the satisfaction of at least all the compulsory requirements. A configuration may be provided in which from a plurality of storage pools that satisfies all the compulsory requirements, a storage pool that is finally selected in the storage volume location destination selection process is determined based on what degree the desired requirement is satisfied. In this case, the storage requirement can be flexibly reflected on the determination of the location destination of the storage volume, and a request for a variety of storage requirements can be achieved. Note that the category of the compulsory requirement and the desired requirement in the storage requirement may be specified by the user or the application that specifies the storage requirement, or a specific element requirement may be set in advance on the storage management server 10 as a compulsory requirement, for example.

(4-3) Storage System Update Process

Figure 12:
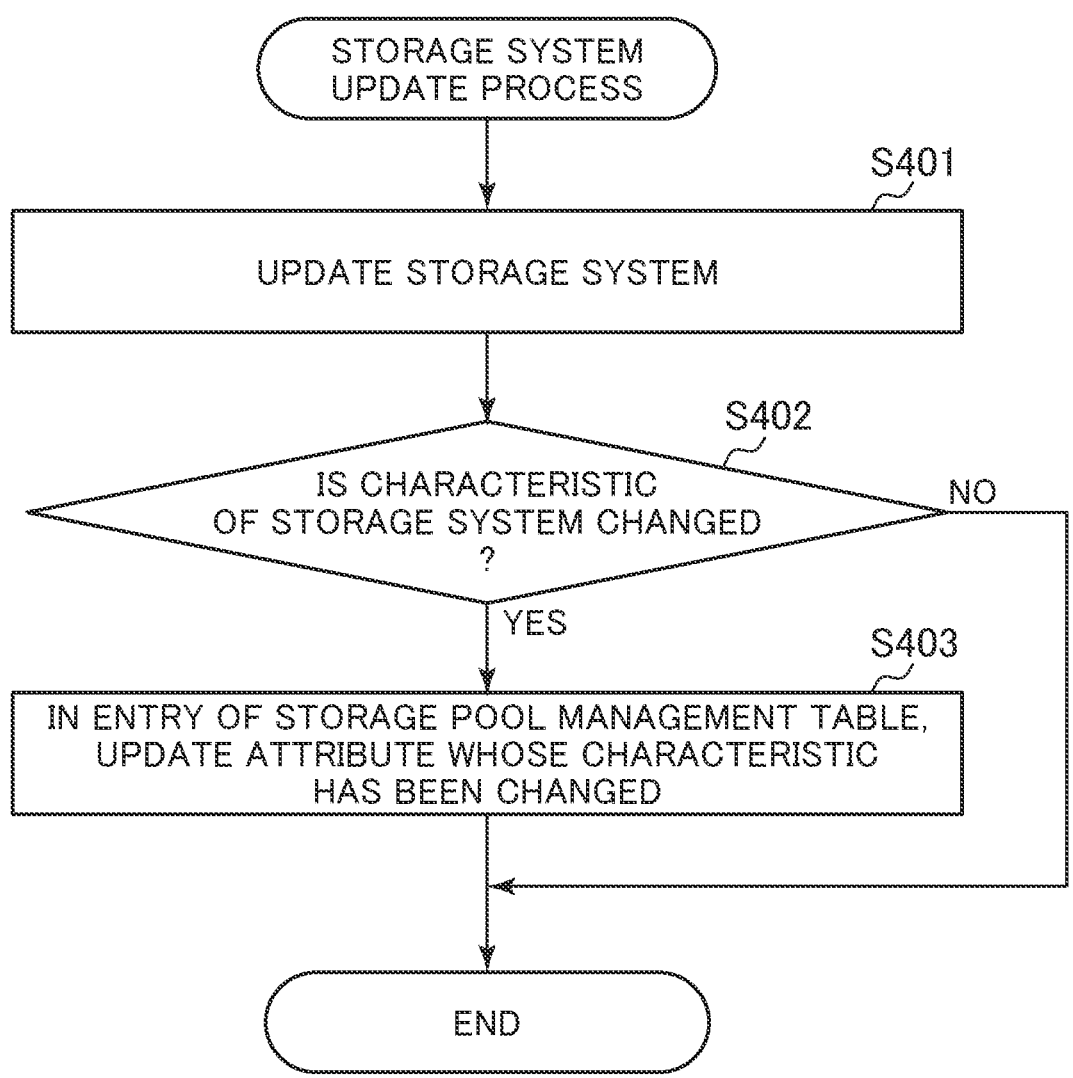
FIG. 12 is a flowchart showing example process procedures of a storage system update process.

FIG. 12 is a flowchart showing example process procedures of a storage system update process. The storage system update process is a process that is executed when the hardware or software of the storage system is updated (upgraded/downgraded), and is mainly executed by the storage integration management software 121 of the storage management server 10.

Examples of specific situations in which the storage system is updated include the case in which the disk 330 is added to the disk array 30 and the case in which a disk is added to the existing storage pool, for example. Also in the case in which a storage volume is newly created in the storage pool, the storage system update process in FIG. 12 is performed after the end of the storage volume creation process shown in FIG. 9. Note that the update of the storage system is started by making an update request to the storage system by the user, for example.

According to FIG. 12, first, a storage system that has accepted an update request from the user updates the storage system, and returns the completion of update to the user (Step S401).

Subsequently, the storage integration management software 121 of the storage management server 10 detects the completion of the update of the storage system in Step S401, collects information on the storage system, and determines whether the characteristic of the storage system is changed (Step S402). As a specific example of a determination method, on information corresponding to the provided protocol 1223 to the free space 1229 in FIG. 3, information presently held in the present storage pool management table 122 (information before updated) is compared with information collected in Step S402 (information after the completion in update), and the storage integration management software 121 can determine whether the characteristic is changed.

In the case in which in Step S402, the storage integration management software 121 determines that the characteristic of the storage system is changed (YES in Step S402), the storage integration management software 121 updates all the attributes whose characteristic has been changed for the entry matched with the ID of the storage system whose storage ID 1221 is updated in the entries of the storage pool management table 122, using the information collected in Step S402 (Step S403), and ends the storage system update process.

On the other hand, in the case in which the storage integration management software 121 determines that the characteristic of the storage system is not changed in Step S402 (NO in Step S402), the storage integration management software 121 does not need to update the storage pool management table 122, and ends the storage system update process as it is.

Note that in the process procedures described above, the user makes an update request of the storage system when the user requests the update of the storage system. However, the present embodiment is not limited to this. The update request of the storage system may be made to the storage management server 10. The timing at which the completion of the update of the storage system is returned to the user is not necessarily limited to the timing after the completion in Step S401. For example, the storage management server 10 may return the completion of update to the user at the timing after the completion in Step S403.

As described above, the storage system update process is described. However, from the viewpoint of management of the characteristic information on the storage pool by the storage pool management table 122, it can be said that the process (specifically processes in Steps S402 to S403) is an example process in the case in which a necessity arises to update the entry already held in the storage pool management table 122. Therefore, also in the case of performing other storage operations (e.g. a change in the configuration of the storage system, for example) by which the characteristic of the storage pool is possibly changed, the storage integration management software 121 performs processes similar to the processes in Steps S402 to S403, and thus all the attributes whose characteristic has been changed can be updated in a predetermined entry, and the storage pool management table 122 can manage the latest characteristic information on the storage pool.

(4-4) Storage Requirement Changing Process

Figure 13:
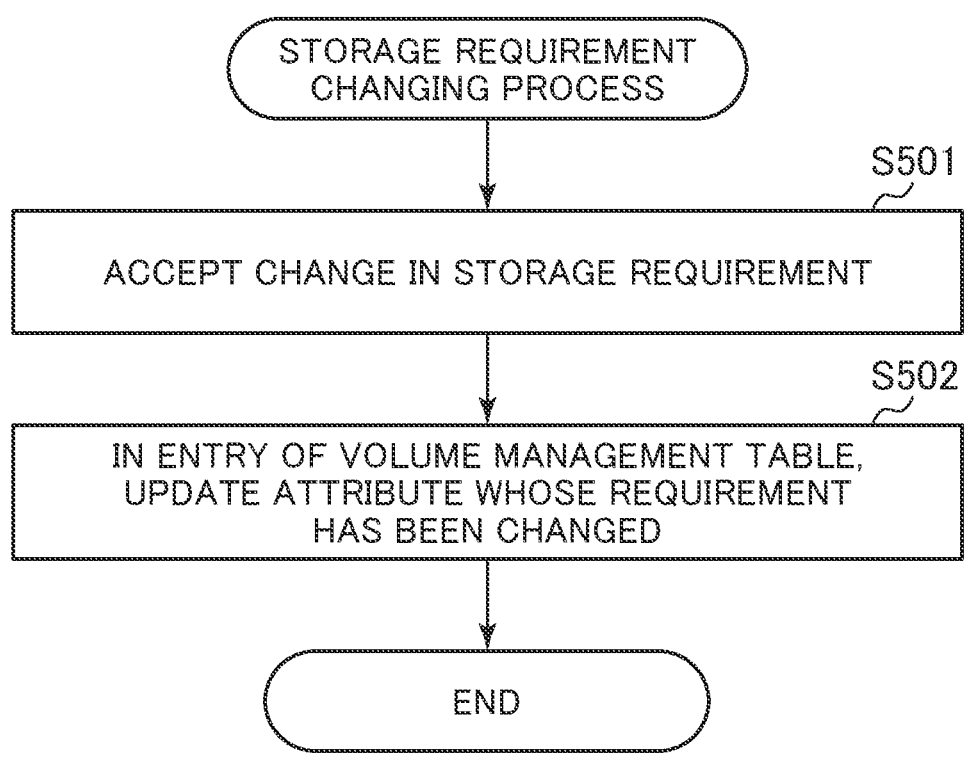
FIG. 13 is a flowchart showing example process procedures of a storage requirement changing process.

FIG. 13 is a flowchart showing example process procedures of a storage requirement changing process. The storage requirement changing process is a process that is executed after the user (e.g. the storage administrator) requests the storage management server 10 for execution when the application program 221 (or the application program 575) changes a storage requirement to be requested.

According to FIG. 13, first, the storage integration management software 121 of the storage management server 10 accepts a change request for a change in the storage requirement from the user (Step S501). The change request for a change in the storage requirement includes the ID of the storage volume to which a requirement is changed or the storage requirement after the requirement is changed.

Subsequently, the storage integration management software 121 updates all the attributes whose characteristic has been changed for the entry whose volume ID 1230 is matched with the ID of the storage volume included in the change request accepted in Step S501 in the entries in the volume management table 123 based on the storage requirement after the requirement is changed, and returns a reply to the user (Step S502).

By performing the process, in the case in which the storage requirement is changed, information on the storage requirement held in the volume management table 123 can be updated corresponding to the change.

(4-5) Storage Volume Relocation Process

Figure 14:
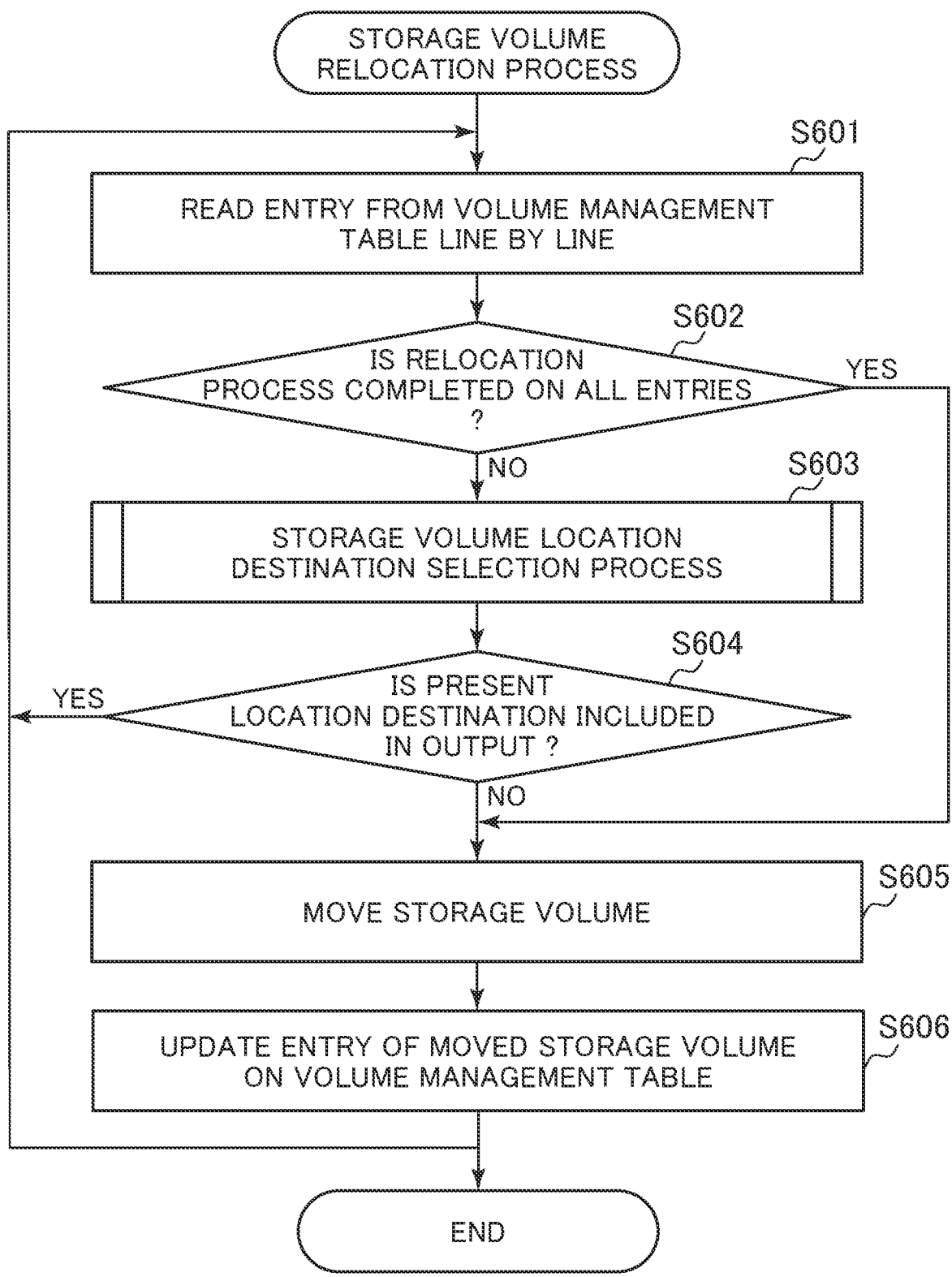
FIG. 14 is a flowchart showing example process procedures of a storage volume relocation process.

FIG. 14 is a flowchart showing example process procedures of the storage volume relocation process. The storage volume relocation process is a process in which a storage pool that is the storage destination (the location destination) of the storage volume already created is again searched and the storage volume is migrated to another storage pool. The trigger of the storage volume relocation process will be described after FIG. 14 is described.

According to FIG. 14, first, the storage integration management software 121 of the storage management server 10 makes reference to the volume management table 123, and reads the entry line by line (Step S601).

Subsequently, the storage integration management software 121 determines whether a process of determining and executing the relocation of storage volumes is completed on the storage volumes corresponding to all the entries in the volume management table 123 (the process after Step S603) (Step S602). In the case in which the storage integration management software 121 determines that the relocation process is completed on all the entries in Step S602 (YES in Step S602), the storage integration management software 121 ends the process.

On the other hand, in the case in which the storage integration management software 121 determines that there is an entry on which the relocation process is not completed in Step S602 (NO in Step S602), the storage integration management software 121 executes the storage volume location destination selection process on the storage volume that holds information in the entry that is read in Step S601 and on which the relocation process is not completed (Step S603). As described above with reference to FIG. 11, by the execution of the storage volume location destination selection process, the storage pool that satisfies the storage requirement of the storage volume is selected.

Subsequently, the storage integration management software 121 determines whether the storage pool that is the present location destination is included in the storage pools selected in the storage volume location destination selection process in Step S603 (Step S604). In the case in which the storage integration management software 121 determines that the storage pool that is the present location destination is included (YES in Step S604), since there is no necessity to migrate the storage volume to another storage pool, the relocation process on the entry is ended, the process returns to Step S601, and the relocation process on another entry is performed.

In the case in which the storage integration management software 121 determines that the storage pool that is the present location destination is not included in Step S604 (NO in Step S604), this means that the storage pool that is the present location destination does not satisfy the storage requirement of the storage volume in the entry, or the storage pool that more preferably satisfies the storage requirement is present. Therefore, the storage integration management software 121 migrates the storage volume in the entry to the storage pool selected in the storage volume location destination selection process in Step S603 (Step S605).

After that, the storage integration management software 121 updates the entry of the storage volume migrated in Step S605 in the volume management table 123 (Step S606). When the processes are performed up to the process in Step S606, the relocation process on the entry (the storage volume) is ended, the process returns to Step S601, and the relocation process is performed on another entry.

As described above, by performing the storage volume relocation process, the storage integration management software 121 can relocate a storage volume to another suited storage pool in the case in which the storage pool that is the storage destination (the location destination) of the storage volume does not satisfy the storage requirement.

The storage volume relocation process described above may be performed at a given timing. However, the storage volume relocation process is preferably performed at least when the characteristic of the storage pool (the storage system in a broad sense) is changed (i.e., characteristic information in the storage pool management table 122 is changed), or when the storage requirement requested for the storage volume is changed (i.e., requirement request information on the volume management table 123 is changed).

A specific example of performing timing is shown. For example, the storage volume relocation process may be started by the operating system 124 of the storage management server 10 at regular time intervals. For example, the storage volume relocation process may be performed subsequent to the storage pool creation process (see FIG. 8), the storage system update process (see FIG. 12), or the storage requirement changing process (see FIG. 13) when these processes are performed in extension. For example, the storage volume relocation process may be performed in the situations in which the storage volume is migrated for maintenance, such as online update.

Note that in the present embodiment, a configuration may be provided in which before the storage volume relocation process shown as an example in FIG. 14 is started, the presence or absence of update in the storage pool management table 122 and the volume management table 123 is determined, and the process in FIG. 14 is executed only in the case in which update is made. For an update determination method, determination may be made based on the date and time of update for each entry, or determination may be made based on the comparison with the snapshot of the previous table. With these configurations, under the situations in which the configuration, for example, of the storage pool or the storage volume is not changed (there is no update in the tables), an unnecessary execution of the storage volume relocation process is omitted, obtaining the effect of suppressing an increase in a processing load in the storage management server 10.

As described above, the information system 1 according to the present embodiment is configured including a plurality of storage systems in different types like the disk array 30, the SDS system 4, and the HCI system 5. In the present embodiment, the term "storage systems in different types" includes difference in types of storage systems like the disk array 30, the SDS system 4, and the HCI system 5 as well as includes difference in various storage characteristics, such as supported functions and data protection level.

In the information system 1 according to the present embodiment, the storage management server 10 that is a storage management apparatus holds first management information relating to the storage pool provided by the storage system (the storage pool management table 122) and second management information relating to the storage volume created in the storage pool (the volume management table 123). The storage pool management table 122 includes characteristic information on the storage pool. The volume management table 123 includes information that indicates a storage requirement for a storage volume and information that indicates a requirement provided in the storage volume. The storage management server 10 (the storage integration management software 121) manages these pieces of information on a plurality of storage systems in integration, and thus various storage operations can be implemented across storage systems having different characteristics.

The detail of the storage operation by the storage management server 10 is as described with reference to FIGS. 8 to 14. For example, in the case in which creating the storage volume is requested using a storage requirement as a parameter, the storage requirement is compared with characteristic information on the storage pools (the storage pool management table 122), and thus a storage pool that satisfies the storage requirement can be selected across a plurality of storage systems (the storage volume location destination selection process), and the storage volume can be created in a suited storage pool corresponding to a storage requirement.

The storage management server 10 can change or update the configuration of the storage system in the storage pool management table 122 or the volume management table 123 and can appropriately update the entry corresponding to a change in the storage requirement, for example, and thus the storage management server 10 can manage the storage system in integration corresponding to a change in the situations of the storage systems in the information system 1.

In the storage volume relocation process, the storage management server 10 determines whether the storage pool that is the location destination of the created storage volume is a suited location destination also at the present point in time, and can change the location destination of the storage volume to a more preferable storage pool based on the determined result. Thus, the effect that provides a storage volume in a plurality of storage systems in different types while the storage requirement is continuously satisfied.

As described above, the embodiment of the present invention is described. However, this is examples for describing the present invention, and this do not mean that the scope of the present invention is limited only to the forgoing embodiment. That is, the present invention can be embodied in other various forms as well.

In the foregoing embodiment, the server computers are present for purposes (e.g. the storage management server 10, the application server 20, the SDS node 40, and any other device). However, one server computer may be configured to serve for a plurality of purposes. For example, a configuration may be provided in which the program executed by the storage management server 10 in the forgoing embodiment may be executed by the SDS node 40. In this case, the user performs management operation using an input/output device (a keyboard or a display) included in the SDS node 40.

In the foregoing embodiment, an example is described in which the I/O request (command) accepted by the storage system is a so-called SCSI command. That is, an example is described in which the SDS is a storage device that accepts the access request at a so-called block level. However, in the information system according to the present invention, the storage system may be a storage device other than this type. For example, the storage system may be a storage device that accepts the access request at the file level or the object level (a so-called NAS (Network Attached Storage) or OSD (Object-based Storage Device)), and any other storage device.

A configuration may be provided in which the programs that cause the CPU to execute the processes in the forgoing embodiment are provided in the state in which the programs are stored on a computer readable storage medium, and installed on devices that execute the programs. The computer readable storage medium is a non-transitory computer, and is a non-volatile storage medium, including an IC card, an SD card, and a DVD, for example. Alternatively, the programs that cause the CPU to execute the processes in the forgoing embodiment may be provided from a program distribution server via a network.

In the drawings, control lines or information lines that are necessary for description are shown, and all the control lines or information lines necessary for products are not always shown. It may be thought that almost all the configurations are connected to each other.

What is claimed is:

1. A storage management apparatus that manages an information system in integration in which a plurality of storage systems is present,
   wherein: the storage management apparatus holds first management information relating to storage pools provided by the storage systems and second management information relating to storage volumes created in the storage pool;
   the first management information includes characteristic information on the storage pool;
   the second management information includes requested requirements information that indicates a storage requirements requested for the storage volume and provided requirements information that indicates the requirements provided on the storage volume;
   when creating the storage volume using the requested storage requirements as parameters, the storage management apparatus executes a location destination selection process, and by execution of the location selection process the storage pool that satisfies the storage requirement is selected based on comparison of the storage requirement with the characteristic information held in the first management information;
   the storage management apparatus creates the storage volume in the storage pool selected by the location destination selection process; and
   the storage management apparatus adds an entry relating to the created storage volume to the second management information.

2. The storage management apparatus according to claim 1,
   wherein when a change in the storage requirement is requested for the storage volume that already exists, the request requirement information in an entry relating to the existing storage volume held in the second management information is updated based on a content of the requested change.

3. The storage management apparatus according to claim 1,
   wherein when the characteristic of storage pool is changed, the characteristic information held in the first management information is updated based on a content of the change.

4. The storage management apparatus according to claim 1,
wherein: when the characteristic information held in the first management information or the request requirement information held in the second management information is changed, the location destination selection process is re-executed; and
when the storage pool that is different from a present location destination is selected, the storage volume is migrated to the storage pool that is newly selected, and the second management information is updated with information after the migration.

5. The storage management apparatus according to claim 1,
wherein in the location destination selection process, the storage pool having the characteristic information that satisfies all element requirements included in the storage requirement is set to the storage pool that satisfies the storage requirements.

6. The storage management apparatus according to claim 1,
wherein in the location destination selection process, the storage pool having the characteristic information that satisfies a specific element requirement included in at least the storage requirement is set to the storage pool that satisfies the storage requirement.

7. The storage management apparatus according to claim 6,
wherein in the location destination selection process, from the storage pools that satisfy the storage requirement, a priority level of the storage pool for the selection is determined based on comparison of an element requirement other than the specific element requirement with the characteristic information.

8. The storage management apparatus according to claim 1,
wherein in the location destination selection process, when a plurality of the storage pools becomes a candidate of the storage pool that satisfies the storage requirement, a priority level of the storage pool for the selection is determined based on a comparison result of a predetermined element requirement included in the storage requirement.

9. The storage management apparatus according to claim 1,
wherein the characteristic information on the storage pool includes at least any of a function that is provided by the storage pool, data protection level, or processing performance.

10. An information system comprising:
a plurality of storage systems; and
a storage management apparatus connected to the plurality of storage systems via a network, the storage management apparatus being configured to manage the plurality of storage systems in integration,
wherein: the storage management apparatus holds first management information relating to a storage pool provided by the storage systems and second management information relating to a storage volume created in the storage pool;
the first management information includes characteristic information on the storage pool;
the second management information includes request requirement information that indicates a storage requirement requested for the storage volume and provided requirement information that indicates a requirement provided on the storage volume; and
when creating the storage volume is requested using the storage requirement as a parameter, the storage management apparatus executes a location destination selection process, the storage pool that satisfies the storage requirement is selected based on comparison of the storage requirement with the characteristic information held in the first management information,
the storage management apparatus creates the storage volume in the storage pool selected by the location destination selection process, and
the storage management apparatus adds an entry relating to the created storage volume to the second management information.

11. The information system according to claim 10,
wherein: when the characteristic information held in the first management information or the request requirement information held in the second management information is changed, the storage management apparatus re-executes the location destination selection process; and
when the storage pool that is different from a present location destination is selected, the storage management apparatus migrates the storage volume to the storage pool that is newly selected, and updates the second management information with information after the migration.

12. The information system according to claim 10,
wherein at least one of the plurality of storage systems is a type of storage system in which software having a storage function is executed on a physical computer and the computer becomes a storage.

13. A storage management method by a storage management apparatus that manages an information system in integration in which a plurality of storage systems is present,
wherein: the storage management apparatus holds first management information relating to a storage pool provided by the storage systems and second management information relating to a storage volume created in the storage pool;
the first management information includes characteristic information on the storage pool;
the second management information includes request requirement information that indicates a storage requirement requested for the storage volume and provided requirement information that indicates a requirement provided on the storage volume; and
when creating the storage volume is requested using the storage requirement as a parameter, the storage management apparatus executes a location destination selection process, the storage pool that satisfies the storage requirement is selected based on comparison of the storage requirement with the characteristic information held in the first management information,
the storage management apparatus creates the storage volume in the storage pool selected by the location destination selection process, and
the storage management apparatus adds an entry relating to the created storage volume to the second management information.

14. The storage management method according to claim 13,
wherein: when the characteristic information held in the first management information or the request requirement information held in the second management information is changed, the storage management apparatus re-executes the location destination selection process; and when the storage pool that is different from a present location destination is selected, the storage management apparatus migrates the storage volume to the storage pool that is newly selected, and updates the second management information with information after the migration.

* * * * *